United States Patent [19]

Lundstrom

[11] Patent Number: 5,224,681
[45] Date of Patent: Jul. 6, 1993

[54] HAND RELEASABLE LOCKING COLLAR

[76] Inventor: Donald A. Lundstrom, 661 Grove St., Worcester, Mass. 01605

[21] Appl. No.: 874,672

[22] Filed: Apr. 27, 1992

Related U.S. Application Data

[63] Continuation-in-part of Ser. No. 508,552, Apr. 13, 1990, Pat. No. 5,108,066.

[51] Int. Cl.⁵ .................... A44B 21/00; F16M 11/00
[52] U.S. Cl. ................... 248/410; 24/649; 24/522; 24/524; 285/902
[58] Field of Search ............. 24/522, 524, 136 R, 24/136 L, 115 M, 649, 650, 270, 488; 403/104, 374, 110, 373, 318; 248/410, 409, 245; 285/902

[56] References Cited

U.S. PATENT DOCUMENTS

| | | | |
|---|---|---|---|
| 506,716 | 10/1893 | McNellis | 24/522 |
| 836,303 | 11/1906 | Christensen | 248/410 |
| 875,121 | 12/1907 | Shryock | 24/136 R |
| 1,203,071 | 10/1916 | Straub | 248/410 |
| 1,702,359 | 2/1929 | Molmark | 24/522 |
| 2,090,550 | 8/1937 | Pilblad | 248/410 |
| 2,806,723 | 9/1957 | Fairclough | 248/410 |
| 3,402,947 | 9/1968 | Lewis | 248/410 |
| 3,480,247 | 11/1969 | Waner | 248/410 |
| 3,868,193 | 2/1975 | Schott | 24/135 R |
| 3,982,844 | 9/1976 | De Anda et al. | 24/115 M |
| 4,169,687 | 10/1979 | Schull | 248/410 |
| 4,261,601 | 4/1981 | Sloan | 285/902 |
| 4,545,618 | 10/1985 | Kitamura | 248/410 |
| 4,646,398 | 3/1987 | Myhrman | 24/524 |

FOREIGN PATENT DOCUMENTS

| | | | |
|---|---|---|---|
| 0717875 | 9/1965 | Canada | 285/902 |
| 0462560 | 10/1968 | Switzerland | 285/902 |
| 0284564 | 2/1928 | United Kingdom | 285/902 |

Primary Examiner—Victor N. Sakran
Attorney, Agent, or Firm—Bromberg & Sunstein

[57] ABSTRACT

A device for releasably gripping a shaft has a body with a central channel for receiving the shaft. The device also has an arrangement, mounted to the body, for gripping and releasing the shaft when a member of the arrangement, is respectively in first and second positions with respect to the body. A sleeve is disposed concentrically outside of the body, and is mounted for axial movement with respect to the body in such a manner as to cause axial movement of the member, so axial movement of the sleeve in a first direction will achieve release of the shaft. In this manner, one may grip the sleeve and, in a single motion, achieve release of the shaft and slide the device relative to the shaft.

20 Claims, 3 Drawing Sheets

HAND RELEASABLE LOCKING COLLAR

This application is a continuation in part of application Ser. No. 508,552, filed Apr. 13, 1990, now U.S. Pat. No. 5,108,066, which is hereby incorporated herein by reference.

FIELD OF THE INVENTION

This invention relates in general to collars that lock on shafts and in particular to collars that do not require the use of tools for causing the collars to grip and release the shaft.

DESCRIPTION OF THE PRIOR ART

There are many situations where it is desirable to secure objects in a given position on a shaft of given cross section quickly, securely, economically and without the use of tools.

Prior art releasable locking collars generally require multiple steps to permit movement and locking or unlocking of the collar on a shaft.

SUMMARY OF THE INVENTION

The invention provides a device for releasably gripping a shaft that has been inserted into the device. In one embodiment, the device has a body with a central channel for receiving the shaft. The device also has an arrangement, mounted to the body, for gripping and releasing the shaft when a member of the arrangement, is respectively in first and second positions with respect to the body. A sleeve is disposed concentrically outside of the body, and is mounted for axial movement with respect to the body in such a manner as to cause axial movement of the member, so that axial movement of the sleeve in a first direction will achieve release of the shaft. In this manner, one may grip the sleeve and, in a single motion, achieve release of the shaft and slide the device relative to the shaft.

In further embodiments, an arrangement urges the sleeve in an axial direction opposite to the first direction. Also the device in a further embodiment includes a torroidal end cap axially adjacent to the sleeve, and affixed to the body in such a location that motion of the sleeve in the first direction is away from the cap. Additionally, the gripping arrangement includes a clutch plate having a central opening with a (second) bias means for biasing the clutch plate at an oblique angle with respect to the shaft, and the sleeve includes an actuating tab projecting radially upward for engagement against a circumferential contact region of the clutch plate. The body includes a ledge for restricting axial motion of the clutch plate therewithin in the first direction and the end cap includes an axial projection toward a circumferential pivot location that is generally opposite to the circumferential contact region. In this way, the axial projection restricts axial motion of the clutch plate at this location in a direction opposite to the first direction and provides a pivot arrangement. The clutch plate preferably has a plurality of projections facing radially inward into the opening, such that the projection tend to grip the shaft when the plate is disposed at an oblique angle. The sleeve and the end may have a generally triangular cross section and collectively present a substantially continuous outside surface. The triangle of the cross section is beneficially equilateral and has rounded vertices.

BRIEF DESCRIPTION OF THE DRAWINGS

These and other features of the invention will be more readily apparent from the following detailed description of specific embodiments of the invention, as illustrated in the accompanying drawings, in which.

DESCRIPTION OF THE PREFERRED EMBODIMENTS

Figure 1:
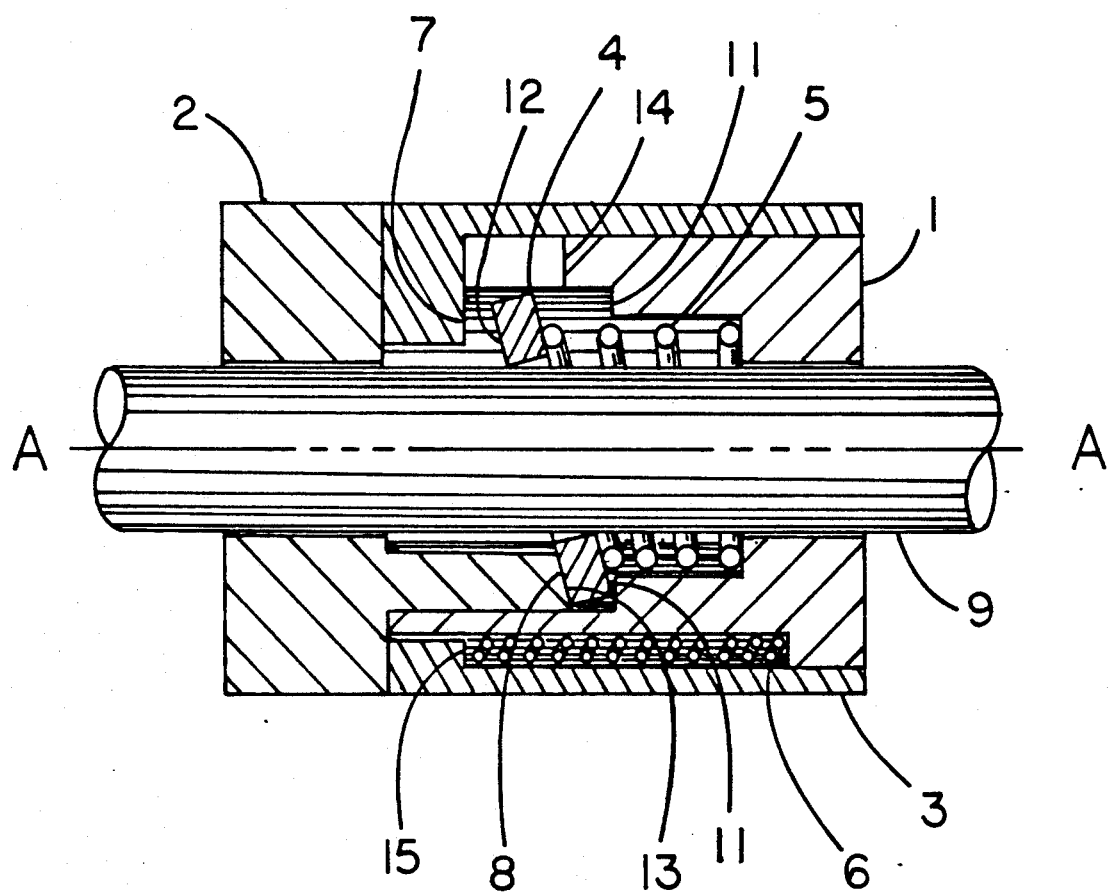
FIG. 1 is a longitudinal section of a preferred embodiment of the invention.

As shown in FIG. 1 a preferred embodiment of a locking collar in accordance with the present invention includes a body 1 which is so configured to accept the end cap 2 and to provide a central channel with an inner cylindrical surface through which shaft 9 may be gripped.

The shaft 9 is gripped by a clutch plate 4 having an opening through which the shaft 9 is passed; a spring 5 provides an arrangement to bias the clutch plate at an oblique angle with respect to the longitudinal axis A—A of the shaft 9. A sleeve 3 is fitted concentrically around the body 1 and is mounted to permit axial movement in a first direction, which, in FIG. 1, is toward the right. The sleeve 3 includes an actuating tab 7, which projects radially inward. When the sleeve 3 is moved in the first direction, the actuating tab engages against a circumferential contact region 12 of the clutch plate. The clutch plate is pivotally mounted at a circumferential pivot location 13 that is opposite to the region 12.

The body 1 further provides a ledge 11 to limit the axial motion of the clutch plate 4 in a first direction and also contains a recess to centralize the clutch spring 5.

The body 1 also has an inner shape which, while providing clearance for the clutch plate 4, also has a complementary shape to prevent rotation of the clutch plate. Recesses in the housing accommodate sleeve return springs 6, and clearance is provided for the clutch plate actuating tab 7 on the sleeve 3.

The end cap 2, affixed to the body 1, restricts axial motion of the sleeve away from the first direction and prevents removal of the sleeve; it also provides an inner cylindrical surface through which the shaft is passed. A projection on the end cap 2 restricts axial motion of the clutch plate 4 in a direction opposite to the first direction at the circumferential pivot location 13 of the clutch plate 4. Collectively, the projection 8 and the ledge 11 form a pivot at the circumferential pivot location 13. Additionally, when the clutch plate 4 is gripping the shaft 9, the projection 8 and ledge 11 oppose any relative axial forces that may occur between the shaft and the locking collar, so as to keep the collar from moving relative to the shaft.

The sleeve 3 moves axially over the outer surface of the body 1. An actuating tab 7 engages the clutch plate to unseat the locking engagement with the shaft, thereby permitting removal of the assembly from the shaft. The actuating tab 7 also serves to limit motion of the sleeve 3 in the first direction, which releases the engagement with the shaft, because the tab 7 eventually contacts secondary ledge 14 of the body. The sleeve has preferably three additional spring tabs 15 to contact corresponding sleeve return springs 6, which return the sleeve to a position of contact with the end cap.

Figure 2:
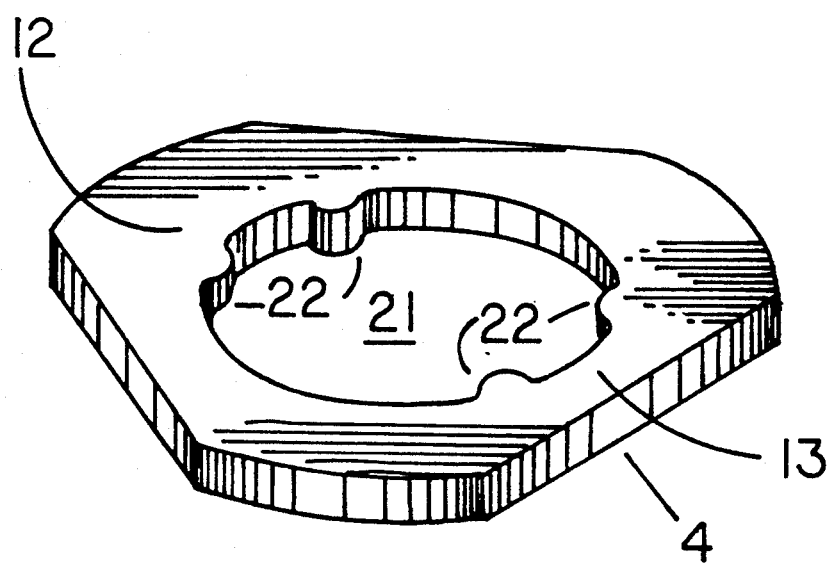
FIG. 2 shows a top perspective view of a preferred embodiment of the clutch plate 4 of FIG. 1.

The clutch plate 4 shown in FIG. 2 is constructed of durable material such as a hardened grade of steel. The outer surface of the clutch plate is shaped in a manner conforming to the inside of the body 1 to assure proper rotational orientation about the centerline and angular pivoting for locking against the shaft.

As shown in FIG. 2, the plate 4 has a central opening 21 and includes a plurality of projections 22 facing radially inward to grip the shaft 9. The circumferential pivot location 13 lies along a straight edge of the plate to provide a large area for contact with the projection 8 and ledge 11 of FIG. 1. The circumferential contact region 12 is situated at a vertex opposite to the pivot location 13.

The clutch spring 5 of FIG. 1 provides continuous force on the clutch plate in all positions of its travel. When a shaft is passed through the central opening 21 of the clutch plate, the spring 5 causes the collar to be locked on the shaft because the oblique angle of the clutch plate with the shaft axis A—A, resulting from the pivot about region 13 caused by projection 8 of the end cap, causes the projection 22 to engage against the shaft. The oblique angle reduces the radial distance between the projections in the central opening of the clutch plate causing it to lock against the shaft.

Sleeve return springs 6 act between the body and sleeve causing the sleeve to return positively to the at-rest position independent of the angle of rotation of the clutch plate about the pivot location 13 resulting from contact with the shaft 9.

Figure 3A:
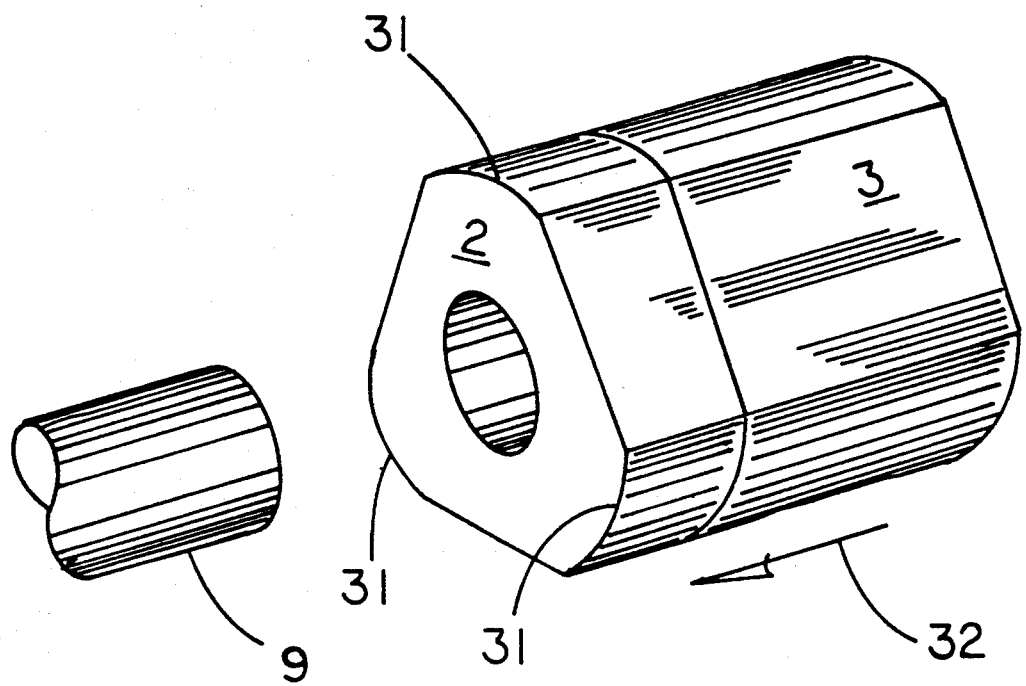
FIG. 3A is a perspective view of the embodiment of FIG. 1 during installation for a shaft.

FIG. 3A depicts the collar positioned for installation on the shaft. As the collar is moved into the desired position on the shaft 9 the spring-loaded clutch plate 4 pivots to provide adequate clearance for the shaft. The collar will slide to the designated location. Axial forces on the collar in a direction opposite to that indicated by the arrow 32 in FIG. 3A will not move the collar. Shown in FIG. 3A are the sleeve end cap 2. These items have a generally triangular cross section, and present a substantially continuous outside surface. The triangle of the cross section is beneficially equilateral and has rounded vertices 31.

Figure 3B:
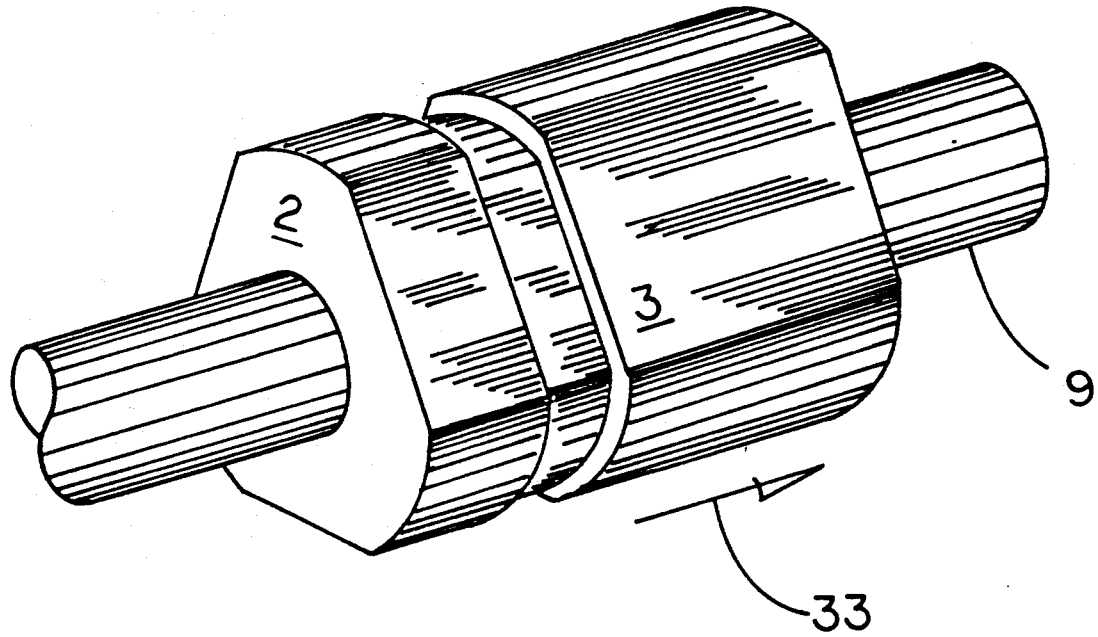
FIG. 3B is a perspective view of the embodiment of FIG. 1 during removal from a shaft.

FIG. 3B shows the removal of the collar. Grasping the sleeve 3 and moving it in the direction of arrow 33 causes the sleeve to move along the body. Such motion creates contact between the actuating tab 7 of the sleeve and the clutch plate region 12 which releases the gripping action of the clutch plate and allows the collar to be removed in the same direction as arrow 33 in a single gesture.

The invention should of course not be considered restricted either to the field of application described above or to the illustrated embodiment, but may be modified in various ways within the spirit and scope of the accompanying claims.

What is claimed is:

1. A device for releasably gripping a shaft, having a longitudinal axis, inserted into the device, the device comprising:
    a body having a central channel for receiving the shaft;
    a clutch plate, mounted within the body and having a central opening for receiving the shaft, for gripping and releasing the shaft when respectively in a first and second position with respect to the body;
    clutch plate bias means, mounted to the body, for biasing the clutch plate at an oblique angle with respect to the shaft; and
    a sleeve, disposed concentrically outside the body and mounted for axial movement with respect thereto, the sleeve including an actuating tab projecting radially inward for engagement against a circumferential contact region of the clutch plate so that axial movement of the sleeve in a first direction achieves release of the shaft.

2. A device according to claim 1, wherein the sleeve is of sufficient axial length to cover a predominant axial portion of the body.

3. A device according to claim 2, further comprising: first bias means for urging the sleeve in an axial direction opposite to the first direction.

4. A device according to claim 2, further comprising: a torroidal end cap axially adjacent to the sleeve, and affixed to the body in a such a location that motion of the sleeve in the first direction is away from the end cap.

5. A device according to claim 3, further comprising: a torroidal end cap axially adjacent to the sleeve, and affixed to the body in a such a location that motion of the sleeve in the first direction is away from the end cap.

6. A device according to claim 1, further comprising: first bias means for urging the sleeve in an axial direction opposite to the first direction.

7. A device according to claim 6, further comprising: a torroidal end cap axially adjacent to the sleeve, and affixed to the body in a such a location that motion of the sleeve in the first direction is away from the end cap.

8. A device according to claim 7, wherein the sleeve and end cap have a generally triangular cross section and collectively present a substantially continuous outside surface.

9. A device according to claim 8, wherein the triangle of the cross section is equilateral and has rounded vertices.

10. A device according to claim 1, further comprising: a torroidal end cap axially adjacent to the sleeve, and affixed to the body in a such a location that motion of the sleeve in the first direction is away from the end cap.

11. A device according to claim 10, further comprising: clutch pivot means for mounting the clutch plate so as to pivot at a circumferential pivot location thereof that is generally opposite to the circumferential contact region.

12. A device according to claim 11, further comprising a ledge in the body for restricting axial motion of the clutch plate therewithin in the first direction and wherein the end cap includes an axial projection toward the circumferential pivot location to restrict axial motion of the clutch plate at such location in a direction opposite to the first direction and to provide the pivot means.

13. A device according to claim 12, wherein the clutch plate has a plurality projections facing radially inward into the opening, such that the projections tend to grip the shaft when the plate is disposed at an oblique angle.

14. A device according to claim 8, wherein the clutch plate has a plurality of projections facing radially inward into the opening, such that the projections tend to grip the shaft when the plate is disposed at an oblique angle.

15. A device according to claim 1, wherein the sleeve has a generally triangular cross section.

16. A releasable locking collar for releasably gripping a shaft comprising:
- a body having a central channel for receiving the shaft;
- a clutch plate, mounted within the body and having a central opening for receiving the shaft, for gripping and releasing the shaft when respectively in a first and second position with respect to the body;
- a sleeve, disposed concentrically outside the body and mounted for axial movement with respect thereto, so that axial movement of the sleeve in a first direction achieves release of the shaft;
- a ledge in the body for restricting axial motion of a circumferential pivot location on the clutch plate in the first direction; and
- clutch pivot means attached to the body to restrict axial motion of the circumferential pivot location of the clutch plate in a direction opposite to the first direction.

17. The device according to claim 16 further comprising clutch plate bias means, mounted to the body, for biasing the clutch plate at an oblique angle with respect to the shaft.

18. The device according to claim 16 wherein the sleeve further includes an actuating tab projecting radially inward for engagement against a circumferential contact region of the clutch plate that is generally opposite to the circumferential pivot location.

19. The collar of claim 16 further comprising first bias means for urging the sleeve in an axial direction opposite to the first direction.

20. The collar of claim 16 wherein the clutch plate has a plurality of projections facing radially inward into the opening, such that the projections tend to grip the shaft where the plate is disposed at an oblique angle.

* * * * *